Oct. 26, 1937.  E. E. WILSON  2,097,170

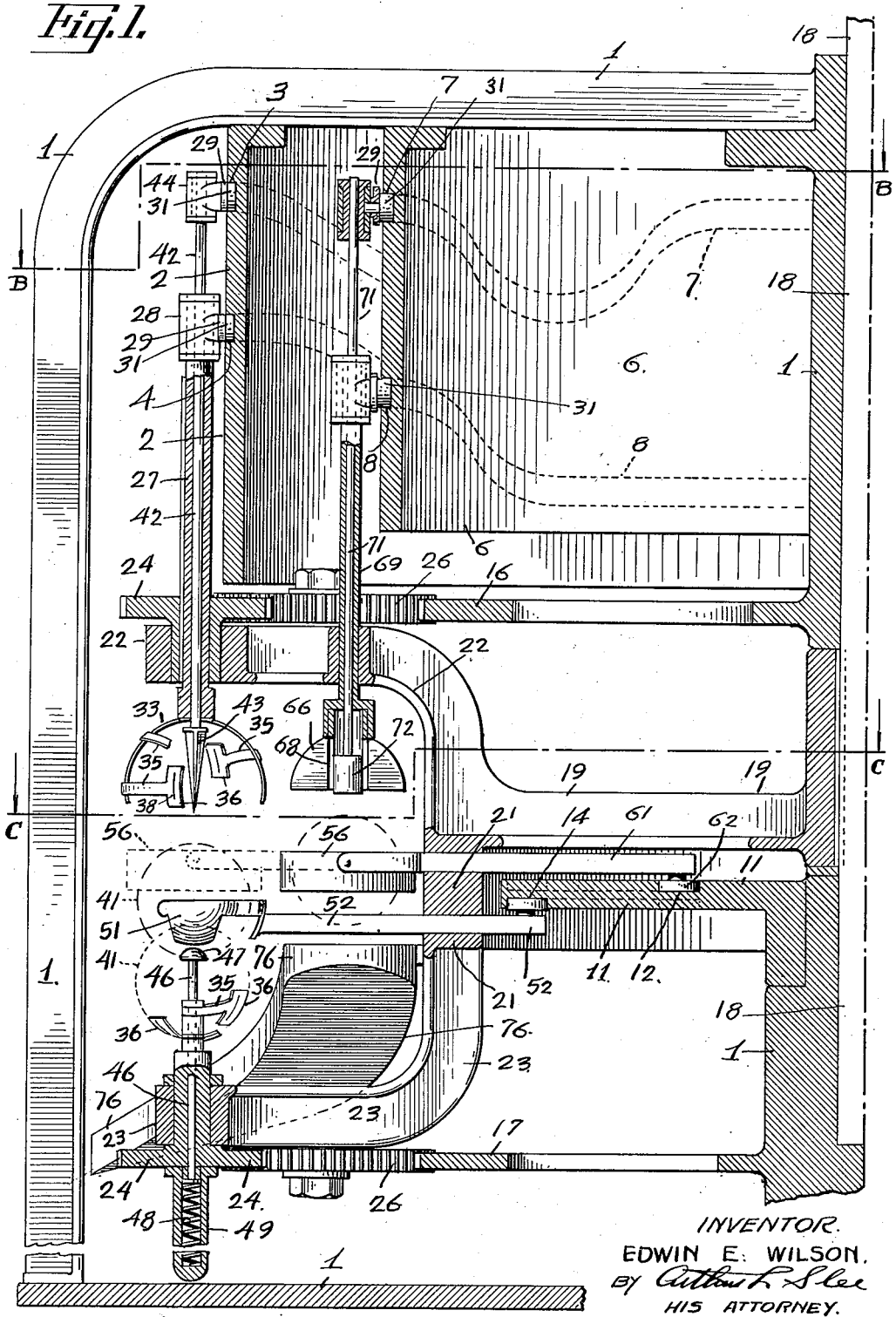

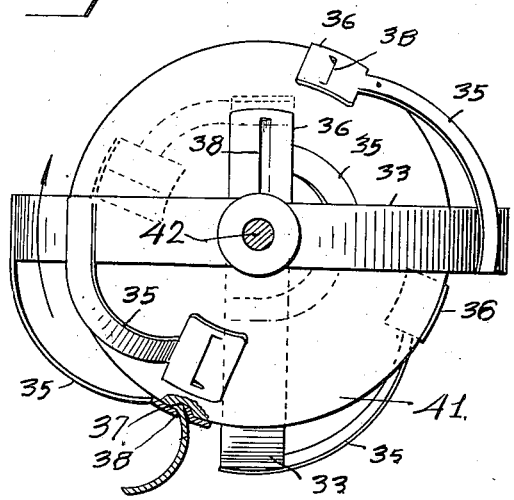
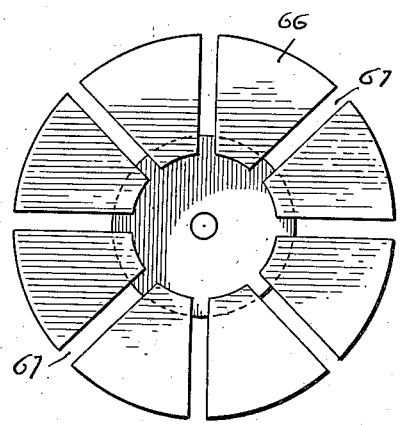
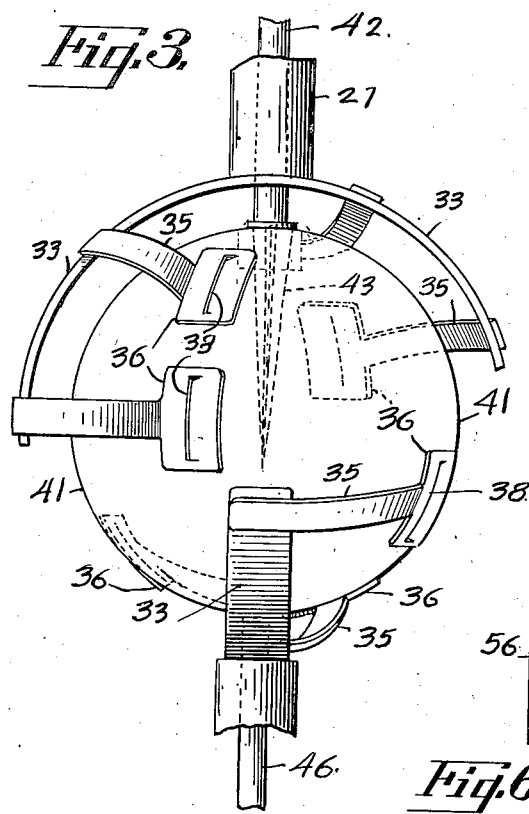
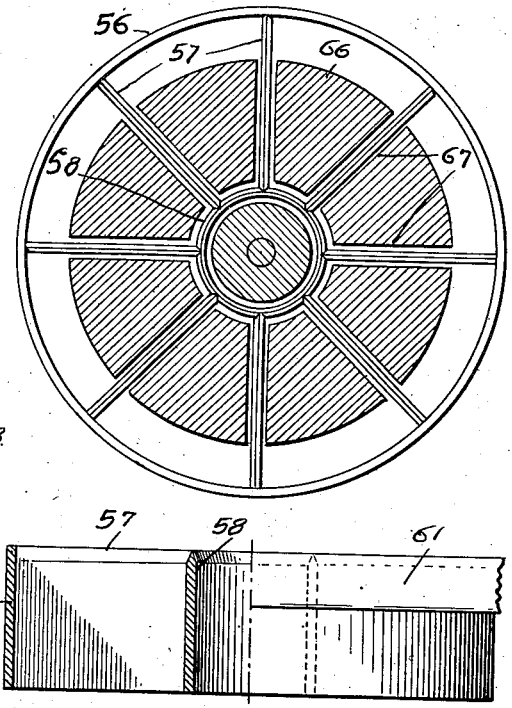

PARING, SLICING, AND CORING MACHINE

Filed Nov. 23, 1936   3 Sheets—Sheet 3

INVENTOR.
EDWIN E. WILSON.
By Arthur L. Slee
HIS ATTORNEY.

Patented Oct. 26, 1937

2,097,170

UNITED STATES PATENT OFFICE 2,097,170

PARING, SLICING, AND CORING MACHINE

Edwin Earl Wilson, Sebastopol, Calif.

Application November 23, 1936, Serial No. 112,388

5 Claims. (Cl. 146—33)

My invention relates to improvements in continuously operated fruit paring, slicing and coring machines wherein improved paring, slicing and coring mechanisms operate in conjunction with improved means for presenting a fruit to be prepared, successively to the several mechanisms in order that perishable produce may be quickly, easily and economically prepared for dehydration, preserving, or for any other purpose.

The primary object of the present invention is to provide a new and improved device for successively paring, slicing and coring apples and similar fruit.

Another object is to provide a new and improved paring, slicing and coring machine for apples and similar fruit, having improved means for adapting the paring means, within certain limits, to various sizes and shapes of apples and similar fruits.

A further object is to provide new and improved means for separating sliced apples from the parings and cores thereof.

A still further object is to provide a new and improved device of the character set forth which shall be continuous in operation in order to reduce the cost of preparing apples and similar fruit and perishable produce for dehydrating or preserving.

I accomplish these and other objects by means of the improved device disclosed in the drawings forming a part of the present application, and in which—

Fig. 1 is a broken vertical sectional view of one half of my improved device, the other half being a duplicate thereof;

Fig. 2 is an enlarged plan view of one of the paring devices;

Fig. 3 is an enlarged broken elevation of both paring devices operating in conjunction;

Fig. 4 is a bottom plan view of a slicing plunger;

Fig. 5 is a top plan view of the combined slicer and corer with the plunger, in section, therein;

Fig. 6 is a broken side elevation of the combined slicer and corer;

Figures 7, 8, 9:
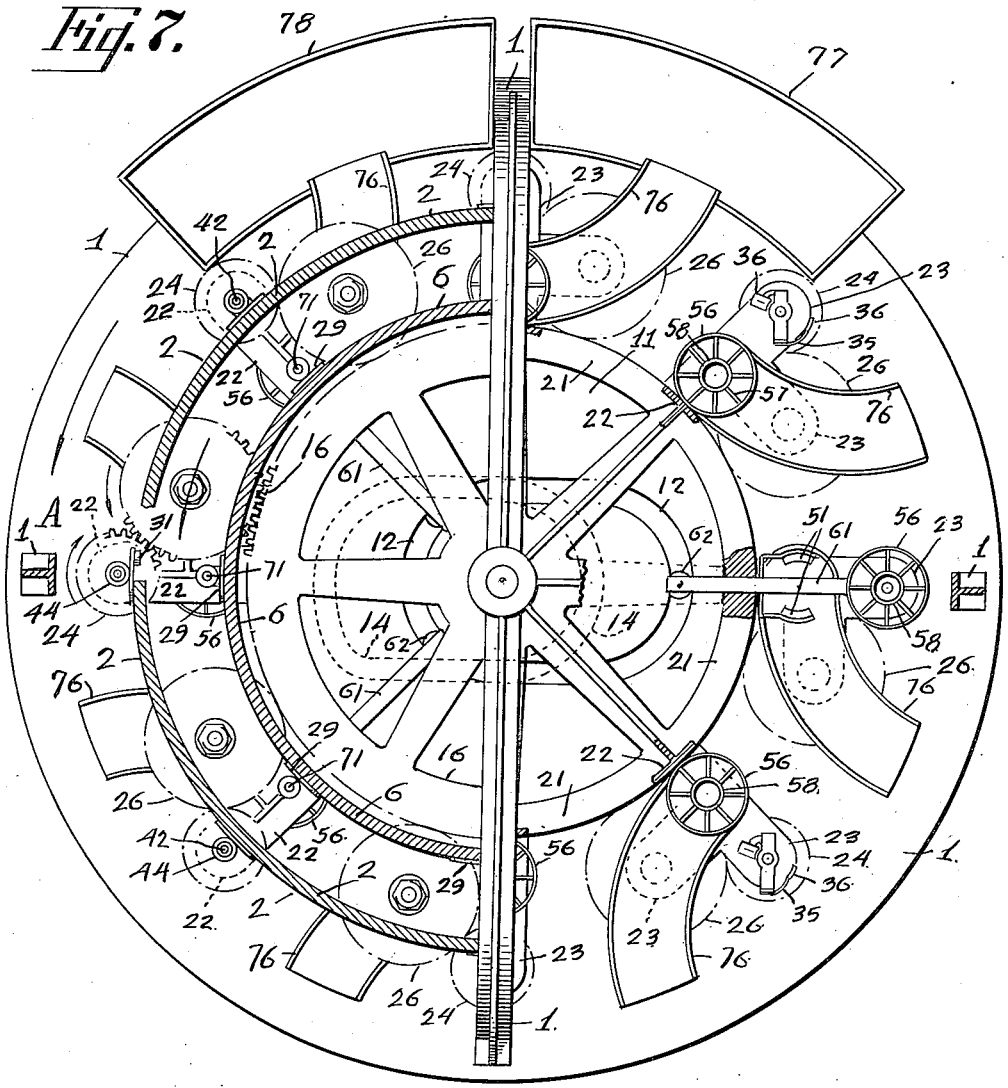
Fig. 7 is a broken plan view, partly in section, of the machine, the left hand half being taken on line B—B and the right hand half being taken on the line C—C of Fig. 1, in the directions indicated.
Fig. 8 is a detail view of one of the cam engaging means.
Fig. 9 is a cross section of one of the impalers.

Referring to the drawings:

The numeral 1 is used to designate in general a suitable main frame provided at its upper end with an outer cylindrical cam 2 having grooves 3 and 4 therein, and an inner cylindrical cam 6 having grooves 7 and 8, and a flat plate or disc cam 11 having grooves 12 and 14 in the upper and lower faces, respectively, as disclosed in full and dotted lines in Fig. 7 of the drawings. The frame 1 is also provided with upper and lower stationary gears 16 and 17.

A suitably driven shaft 18 is rotatably mounted in a vertically disposed position within the center of the main frame 1, and has keyed thereto a spider 19 carrying a ring 21 from which a plurality of upper and lower arms 22 and 23, respectively, extend.

A gear 24 is rotatably mounted in the end of each upper arm 22 and meshes with an idler 26 in turn meshing with the upper stationary gear 16 secured to the main frame 1. A sleeve 27 is splined through each gear 24 and is provided at its upper end with a rotatable sleeve 28 upon which is pivotally mounted a yoke 29 carrying at each end rollers 31, as disclosed in Fig. 8 of the drawings, said rollers 31 engaging the lower groove 4 of the outer cylindrical cam 2, the purpose of which will be hereinafter more fully set forth.

The lower end of each sleeve 27 is provided with a preferably arcuate spring member or substantially semicircular bow 33, from which extends horizontally a plurality of resilient spring parers 36, each parer comprising a substantially rectangular plate, slightly arcuate in cross section, at the end of a flat spring stem 35 extending from the bow 33 and having a centrally located and longitudinally disposed slot, one edge of which is slightly offset from the plate as at 37 and thus arranged in parallel spaced relation to said body to form a guarded cutting edge or paring means on one side of said slot 38. The parers 36, stems 35 and bow 33 form a substantially semispherical cage to enclose, when operating in conjunction with a similar bow 33 and parers 36 below it, an apple or similar fruit to be pared, said fruit being represented by the circle 41. The parers 36 are each arranged within a separate horizontally disposed zone, relatively to the apple 41, with the paring edges 37 in one zone slightly overlapping each adjacent zone so that each parer 36 pares a separate zone upon said apple, in slightly more than a single rotation, and all zones, overlapping, completely cover the spherical surface of said apple 41.

Within each sleeve 27 is slidably and rotatably mounted an impaler stem provided at its lower end with a spear or impaler 43, and a rigid sleeve 44 upon its upper end with a yoke 29 pivotally mounted on said sleeve and carrying rollers 31 engaging the upper groove 3 of the outer cylindrical cam 2, as disclosed in Fig. 1 of the drawings. The yoke 29 and rollers 31, operating in conjunction with said cam 2, around which they move, lie nearly flat with the surface of said cam and thereby prevent rotation of the impaler 42 to in turn prevent rotation of the fruit 41 when in engaging relation with the revolving parers 36, in a manner hereinafter described.

Each lower bow 33 and its parers 36 are rigidly secured to the gear 24 rotatably mounted within each lower arm 23 of the ring 21 on the spider 19, said gear 24 meshing with an idler 26 in turn rotatably mounted upon the lower arm and in turn meshing with the lower stationary gear 17 of the main frame 1.

A stem 46 is slidably and coaxially mounted within each lower gear 24 and is provided at its upper end with a head 47 for engaging the natural indentation or concavity, usually found in opposite sides of an apple, for the purpose of operating in conjunction with the impaler 42 to substantially center said apple 41 relatively to the parers 36 as hereinafter more fully described. The lower end of each stem 46 engages a suitable spring 48 within a pocket 49 carried by each lower gear 24, as disclosed in Fig. 1 of the drawings.

A receiver or holder comprises a pair of resilient arms 51 at the outer end of a rod 52 extending radially and slidably through the ring 21 between each pair of upper and lower arms 22 and 23 and is provided at its inner end with a suitable roller 53 engaging the groove 14 in the lower face of the disc cam 11, as disclosed in Fig. 1 of the drawings, there being one holder 51 and rod 52 for each set of upper and lower arms 23 and 22 of the spider 19.

Similarly, a combined slicer and corer is provided directly over each holder 51, and comprises an annulus 56 provided with vertically disposed radial arms or partitions 57, radiating from a central tube or corer 58, the upper edges of said arms 57 and tube 58 being sharpened or edged centrally of their upper edges. Each slicer and corer, or annulus 56 is mounted upon the outer end of a rod 61, also slidably mounted radially through the ring 21 and directly over the rod 52 of the holder 51 and terminating with a roller 62 engaging the cam groove 12 in the upper face of the disc cam 11, as disclosed in Figs. 1 and 7 of the drawings.

Arranged adjacent each parer group is a vertically slidable plunger 66 slotted radially in its bottom face as at 67 to straddle the radial arms 57 of the annulus 56 and cored centrally as at 68 to enclose the central tube 58, as disclosed in Figs. 4 and 5 of the drawings. Each plunger 66 is mounted upon the lower end of a sleeve 69 slidably mounted through an adjacent upper arm 22 of the ring 21, the upper end of said sleeve having pivotally mounted thereon a yoke 29 provided with rollers 31 at the ends thereof and engaging the lower groove 8 of the inner cylindrical cam 6 to raise and lower the plunger 66 and prevent rotation thereof. Within each sleeve 69 is slidably mounted a rod 71 also provided at its upper end with a yoke 29 carrying rollers 31 which engage the upper groove 7 of the cam 6.

A preferably cylindrical head 72 is mounted upon the lower end of the rod 71 for moving into the tube 58 of its respective annulus or slicer 56 directly below it.

It should be noted that the yokes 29 and rollers 31 of the stem of the impaler, the sleeve 69 of the plunger 66 and the rod 71 of the head 72 prevent rotation of the impaler 43, plunger 66 and head 72, respectively, as they are revolved around the central shaft 18 of the main frame 1, while the yoke 29 and rollers 31 of the sleeve 27 carrying the upper parer group are rotatably mounted upon the sleeve 27 so that said sleeve 27 and parers carried thereby may rotate while they revolve around the central shaft 18.

An inclined chute 76 is arranged below each slicer 56 and plunger 66 above it. At suitable positions around the outer edge of the main frame 1 are arranged slice receiving and core receiving receptacles, 77 and 78, respectively, of any suitable nature.

In operation:

Any suitable source of power, not shown, may be operatively connected to the central shaft 18 to rotate the same and the spider 19 attached thereto and carrying the ring 21, and the upper and lower sets of arms 22 and 23 and their respective upper and lower parer groups, holder 51, slicer and corer 56, the plunger 66 and head 77 mounted centrally therein, and the chute 76.

When the machine is rotated in the direction indicated in Fig. 7 of the drawings, an apple 41, or similar fruit, is placed within the holder 51 at the point A. This holder, which is directly under the impaler 43, lightly holds the said apple 41 until, with continued rotation of the machine, said impaler is moved downwardly by its actuating groove 3 with the sleeve 27 and its group of parers 36 closely following. As the impaler 43 engages the upper concavity found in substantially all apples, said apple is forced through the spring arms of the holder 51 and into engaging relation with the head 47 of the stem 46 arranged centrally of the lower parer group, which head 47 resiliently or yieldingly engages the lower concavity of said apple 41 and thereby tends to center said apple relatively to the opposite paring groups. As soon as the impaler 43 is thrust through the apple 41 by resistance of the spring 48, said apple is held against rotation by said impaler and its triangularly arranged blades. At this time the receiver or holder 51 is drawn inwardly by the roller 53 and groove 14 in the lower face of the disc cam 11. Continued rotation of the spider 19, ring 21 and arms 22 and 23 will cause the impaler 43 to move the apple 41 into engaging relation with the rotating lower parers 36 and the upper parer group, closely following the impaler 43, then moves into engaging relation with the upper half of said apple and slightly more than one rotation of the parer groups around said apple 41 will completely pare the same.

After the apple 41 has been completely pared the upper parer group is returned by the groove 4 of the cam 2, to their uppermost position, with the impaler 43 and the pared apple closely following. Continued rotation of the spider 19 will now, through the groove 12 in the upper face of the stationary disc cam 11, move the combined slicer and corer or annulus 56 to a position directly under the impaler 43 and apple 41 thereon, as disclosed in dotted lines in Fig. 1 of the drawings, and in full lines at the right hand of Fig. 7 of the drawings.

By means of suitable cam motion the impaler 43 now moves the pared apple 41 down onto and partially presses the same into the slicer or annulus 56. When so moved thereinto, it should be noted that there will be a far greater engaging area of the slicer and corer with said apple than the engaging area of said impaler therewith. Portions of said apple are not only pressed and wedged between the radial arms 57, by reason of the cutting edge being arranged centrally of the upper edges of said arms, but the core of said apple is also partly wedged or squeezed into the central tube 58. Continued rotation of the spider 19 carrying the impaler 43 around its cam will again move said impaler upwardly, leaving the pared apple tightly wedged within the combined slicer and corer. Continued rotation of the spider 19 now causes the upper groove 12 of the stationary disc cam 11 to move the slicer with its partially impaled apple directly under the plunger 66, or in the position indicated in Fig. 1 of the drawings. By means of its groove 8 on the inner cam 6, the sleeve 69 and plunger 66 thereon are now moved downwardly and as the grooves 67 of said plunger 66 straddle the radial arms 57 said apple is forced completely through said slicer and dropped into the inclined chute 76, which, at this point in the operation or rotation of the machine, is passing the trough 77 for receiving said slices. After said chute passes said trough 77 and approaches the trough 78 for receiving cores, the head 72 is actuated by its stem 71, rollers 31 engaging the upper groove 7 of the inner cylindrical cam 6, to move downwardly and press said core through the central tube 58 and into said chute 76 by which it is delivered into the trough 78, thereby separating said cores from the sliced apple.

The above described operation is repeated at each rotation of the spider 19 with its component arms 22, 23, and the upper and lower parer groups, an apple being fed or placed within the holder 51 each time it passes the point A as indicated in Fig. 7 of the drawings.

Having described my invention I claim—

1. A paring, slicing and coring machine comprising an impaler for holding against rotation fruit to be pared; paring means arranged upon opposite sides of said impaler and fruit thereon; means for moving said impaler and fruit and said paring means into engaging relation to pare said fruit; means for actuating said paring means and for separating said fruit and paring means after said fruit has been pared; a combined slicer and corer movably mounted upon said machine; means for moving said slicer and corer to receive said pared fruit from said impaler; means for moving said impaler to transfer said fruit thereon onto said slicer and corer; means for moving the body only of said fruit through said slicer to slice the same; and means for moving said core through the corer after the body of said fruit has been passed through said slicer whereby sliced fruit and the core thereof may be separated.

2. A paring slicing and coring machine comprising the combination of an impaler for holding against rotation fruit to be pared, sliced and cored; rotatable paring means arranged upon opposite sides of fruit upon said impaler; means for constantly rotating said paring means; means for moving said impaler and fruit, and said paring means into engaging relation to pare said fruit; means for disengaging said fruit from said paring means; a combined slicer and corer movably mounted upon said machine; means for moving said slicer and corer to receive pared fruit from said impaler; means for moving said impaler for partially impaling said fruit onto said slicer and corer means; means for moving the body only of said pared fruit through the slicer; means for moving the core of said fruit through said corer only after the body of said fruit has been moved through said slicer; means for moving said slicer and corer around said machine continuously; and means for delivering said sliced fruit and said core at different periods in the operation of said machine whereby said core may be separated from said sliced body.

3. A paring, slicing and coring machine comprising the combination with an impaler for holding against rotation fruit to be pared, sliced and cored, of rotatable paring means mounted upon opposite sides of said impaler and fruit thereon; means for moving said impaler and fruit thereon into engaging relation with the paring means on one side of said impaler and fruit and the opposite paring means into engaging relation with said fruit to pare the same; means for rotating said paring means to pare said fruit; means for disengaging said fruit and paring means; a combined slicer and corer movably mounted upon said machine; means for moving said slicer and corer to receive said fruit from said impaler; means for moving said impaler to partially impale said fruit upon said slicing and coring means and for moving said impaler from engaging relation with said fruit; means for rotating said slicer and corer continuously around said machine; means for moving the body only of said fruit through said slicer; means for moving said core through said corer after said body has been moved through said slicer; and means for receiving said sliced body and delivering the same from said machine at one point in the rotation of said slicer and corer and for receiving said core and delivering the same from said machine at a different point in said rotation of said machine, whereby said sliced fruit and core may be separated.

4. A paring slicing and coring machine comprising a frame; upper and lower stationary gears mounted in said frame; a spider rotatably mounted within said machine and between said upper and lower gears and provided with a plurality of pairs of upper and lower arms arranged directly above and below each other; an impaler slidably mounted within each upper arm; paring means rotatably mounted upon each upper arm and above said impaler; similar paring means rotatably mounted within each lower arm and below said impaler; means operatively connecting both paring means with said stationary gears to rotate said paring means; means for moving said impaler and fruit thereon into engaging relation with the lower paring means and said upper paring means into engaging relation with said fruit to pare the same; a combined slicer and corer slidably mounted for radial movement in said machine to and from a position directly below said impaler; means for disengaging said fruit from said paring means; means for moving said slicer and corer below said impaler to receive fruit therefrom; means for moving said impaler to transfer fruit thereon onto said slicer and corer; means for moving the body only of said fruit through said slicer; and means for moving said core through said corer and slicer only after said body has been sliced therethrough whereby said sliced body and core may be separated.

5. A paring, slicing and coring machine comprising the combination with a main frame of upper and lower stationary gears mounted therein; a spider rotatably mounted for horizontal rotation between said gears and having a plurality of sets of upper and lower arms, each upper arm being arranged directly above each lower arm; paring means rotatably mounted in each upper arm; means operatively connecting said paring means with said upper gear whereby said paring means may be rotated when said spider and upper arms are rotated and be revolved around said machine; similar paring means rotatably mounted in each lower arm; means operatively connecting said similar paring means with said lower stationary gear to rotate said similar paring means when revolved around said main frame by said spider; an impaler slidably mounted coaxially with each upper paring means; means for holding said impaler and fruit thereon against rotation; a receiver radially and slidably mounted within said spider and between each set of upper and lower arms, for receiving fruit to be pared, sliced and cored; means for moving said impaler to impale fruit in said receiver and for moving said fruit from said receiver and into engaging relation with the lower paring means; means for receding said receiver; means for moving said upper paring means into engaging relation with fruit on said impaler; means for rotating said spider to rotate and revolve and thereby actuate both upper and lower paring means; means for moving said impaler and upper paring means for disengaging said fruit and paring means; a combined slicer and corer slidably mounted for radial movement within said spider and between each upper and lower arm; means for moving said slicer and corer to receive fruit from said impaler; means for moving said impaler to transfer fruit thereon onto said slicer and corer; a plunger slidably mounted within said spider and upper arm thereof, one for each upper paring means; means for moving said slicer and corer directly under said plunger; means for moving said plunger to press the body only of fruit on said slicer and corer through the slicer portion thereof to slice said body; means for moving a core of said sliced body through said corer only after the body of said fruit has moved through said slicer; and a chute mounted directly below said slicer and corer and carried by said spider for receiving sliced fruit therefrom and delivering the same from said machine at one point in the rotation of said spider and for receiving cores from said corer and delivering said cores from said machine only after said sliced body has been delivered therefrom, whereby said sliced body and cores may be separated.

EDWIN EARL WILSON.